United States Patent
Kravitz et al.

(10) Patent No.: US 8,179,288 B2
(45) Date of Patent: May 15, 2012

(54) METHOD AND APPARATUS FOR REPORTING A MISSILE THREAT TO A COMMERCIAL AIRCRAFT

(75) Inventors: Arnold Kravitz, Moorestown, NJ (US); Jason Stockwell, Brookline, NH (US); Edward Zablocki, North Andover, MA (US); George Clemence, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 725 days.

(21) Appl. No.: 12/228,512

(22) Filed: Nov. 5, 2008

(65) Prior Publication Data
US 2009/0189785 A1    Jul. 30, 2009

Related U.S. Application Data

(60) Provisional application No. 61/062,237, filed on Jan. 24, 2008.

(51) Int. Cl.
*G08B 21/00* (2006.01)
(52) U.S. Cl. ........ 340/999; 340/945; 340/963; 713/150; 711/163
(58) Field of Classification Search .................. 340/999, 340/540, 945, 963; 244/3.1, 3.15; 342/3, 342/9; 713/150; 711/163
See application file for complete search history.

(56) References Cited

U.S. PATENT DOCUMENTS

| | | | |
|---|---|---|---|
| 5,313,201 A | 5/1994 | Ryan | |
| 5,616,031 A | 4/1997 | Logg | |
| 6,097,315 A | 8/2000 | Minter | |
| 6,122,572 A | 9/2000 | Yavnai | |
| 6,633,801 B1 | 10/2003 | Durlacher et al. | |
| 6,664,989 B1 | 12/2003 | Snyder et al. | |
| 7,053,797 B2 | 5/2006 | Taylor | |
| 7,177,731 B2 | 2/2007 | Sandell et al. | |
| 7,188,007 B2 | 3/2007 | Boorman et al. | |
| 2010/0299493 A1* | 11/2010 | McGee, III | 711/163 |

\* cited by examiner

*Primary Examiner* — Jeffery Hofsass
(74) *Attorney, Agent, or Firm* — Daniel J. Long; Robert K. Tendler

(57) ABSTRACT

An automatic system is provided for alerting ground personnel as to the existence of a threat to commercial aircraft in which the threat is determined by a classified system, but in which the local area network employed by the military missile warning is isolated from an unclassified local network coupled to the aircraft's transponder which transmits the threat existence and status to ground personnel. The barrier to transmitting classified information involves both filtering between the classified LAN and unclassified LAN, the use of only discrete signaling lines in the classified LAN isolated by opto-electronics to provide physical separation between the two local area networks, and communications formatting which precludes the transmission of classified information across the barrier between the classified local area network and the unclassified local area network.

20 Claims, 11 Drawing Sheets

| | Bit No | Substitute |
|---|---|---|
| Label Control Word for TCAS/Mode S Transponder (016) | 01 | 0 |
| | 02 | 0 |
| | 03 | 0 |
| | 04 | 0 |
| | 05 | 1 |
| | 06 | 1 |
| | 07 | 1 |
| | 08 | 0 |
| Source/Destination (SDI) | 09 | 0 |
| | 10 | 0 |
| Attitude Reporting | 11 | 0 |
| Ident (SPI) | 12 | 0 |
| Display Control | 13 | 0 |
| | 14 | 0 |
| Sensitivity Level Control | 15 | 0 |
| | 16 | 0 |
| | 17 | 0 |
| Aircraft Reply Code — 0-7 (7) D4 D2 D1 | 18 | 0 |
| | 19 | 0 |
| | 20 | 0 |
| 0-7 (7) C4 C2 C1 | 21 | 0 |
| | 22 | 0 |
| | 23 | 0 |
| 0-7 (7) B4 B2 B1 | 24 | 1 |
| | 25 | 1 |
| | 26 | 1 |
| 0-7 (7) A4 A2 A1 | 27 | 1 |
| | 28 | 1 |
| | 29 | 1 |
| Sign/Status Matrix (SSM) | 30 | 0 |
| | 31 | 0 |
| Parity (odd) | 32 | 0 |
| Transponder Control | | |

METHOD AND APPARATUS FOR REPORTING A MISSILE THREAT TO A COMMERCIAL AIRCRAFT

CROSS REFERENCE TO RELATED APPLICATION

This application claims rights under 35 USC §119(e) from U.S. Provisional Patent Application Ser. No. 61/062,237 filed Jan. 24, 2008, the contents of which are incorporated herein by reference.

STATEMENT OF GOVERNMENT INTEREST

This invention was made with United States Government assistance under Contract No. HSSCHQ-04-C-00342 awarded by the Department of Homeland Security. The United States Government has certain rights in this invention.

FIELD OF THE INVENTION

This invention relates to the reporting of a threat to a commercial airliner from heat seeking missiles and more particularly to the reporting of the threat to ground personnel without divulging classified information.

BACKGROUND OF THE INVENTION

As part of the Department of Homeland Security, there is a requirement for emergency notification to air traffic controllers if an attack on a commercial aircraft is detected. For this purpose, commercial airliners are provided with a sophisticated aircraft defense system which is capable of reliably detecting a missile threat. This aircraft defense system typically utilizes a missile warning system called the Common Missile Warning System (CMWS) developed for the military. The CMWS is a highly classified system and care must be taken not to divulge classified information when reporting missile threats to the ground.

Note that the missile warning system typically operates in the ultraviolet and senses the excited emissions from a rocket motor exhaust. The system employs sensors and a central processor that provides a UV warner to sense the missile as it approaches. UV radiation is used because there is not a great deal of background clutter in the UV to confuse the warners. Moreover, rocket motors have a very high UV content.

The missile warning system utilizes a central processor running a classified counter-measure effectiveness algorithm. This algorithm is used to reach a conclusion that a given high level of confidence applies to a potential threat, meaning that a missile is in fact detected, as opposed to a cigarette lighter or street lamp with a broken dome on it. The detection and classification of a threat involves highly classified techniques which identify the threat, its location, and whether or not there are multiple targets involved.

Upon reaching a conclusion that a threat exists, a pointer tracker is directed to look at the detected object and to countermeasure the target using a jam head controller powered up with highly classified jam code information. This jam code information is transferred from the Electronics Control Unit, ECU, into a Jam Head Control Unit, JHCU, which in turn is coupled to a laser which has its output transmitted through the pointer tracker. All of the information used in detecting and counter-measuring a missile threat is part of the highly classified Operational Flight Program carried in an Electronics Control Unit, ECU. The ECU holds all of the classified OFP parameters in a User Data Module, or UDM.

More particularly, there is a Department of Homeland Security requirement to automatically and rapidly notify air traffic control that there is in fact a missile threat attacking a specific airliner. There is also a requirement to transmit not only just the fact of a warning but any information about where the aircraft is, where the threat might be, and to do so with an indication that is unambiguous in a secure fashion. The indication of a threat to a commercial airliner must be done automatically with no delays, noting of course that any delay is critical.

If there is in fact a real threat, one wants to alert the air traffic control system, and does not want a man in the loop, namely an individual, who is interpreting any results. More particularly, one does not want to rely on somebody looking out of the cockpit window to ascertain whether the threat is real or not. Thus, the alerting of the personnel on the ground is to be automatic to identify the aircraft, the location of the aircraft and the type of threat, if in fact there is a credible threat. At the very minimum, the system is to indicate that an incident has occurred against an aircraft at a particular location. Moreover, the system itself must be designed for an extremely low false alarm rate, one in literally millions of hours.

It will be appreciated that while there are many requirements for such a system, the primary requirement is to be able to detect and report a threat has been encountered, or that a threat has been defeated, and to make ground personnel, air traffic control or other agencies aware that something has occurred with a high degree of confidence.

Classified Information

In order to provide the high degree of confidence, the military missile warning system is used, with the system running at a highly classified level. The challenge is to integrate this highly classified military missile warning system into a commercial aircraft which has to run at a completely unclassified level when transmitting the data to a ground station.

Thus, the problem is taking knowledge of the situation at the aircraft from a classified system and porting it to an unclassified system which then reports the information to the ground in an unclassified manner.

Note that in the missile warning system employed by the military, there is a highly classified library of characteristics and missile threat types. Moreover, the entire Operating Flight Program (OFP) has elements of the missile warning system which are classified in and of themselves. Thus, it is not only the missile type but also how the entire operating flight program operates which is highly classified. As will be appreciated, in the Operating Flight Program there are elements that are related to laser countermeasure systems which explicitly employ jam codes that are highly classified, with the correlation of the jam code to the particular missile involving the most highly classified information of all.

It is also noted that the military missile warning system includes a countermeasure's effectiveness algorithm. This algorithm incorporated highly classified techniques and information. Moreover, the algorithm that takes the outputs of the sensors that see a bloom, and determines the existence and location of a missile are highly classified. Also, the algorithm which determines that if the bloom still exists after the countermeasure, that the missile turned away from the aircraft and is still burning is likewise highly classified. Also, based on highly classified signature information that is analyzed by the missile warning system, one can also know that the missile has been turned away. In short, the countermeasure algorithms are highly classified, and no portion of the algorithms are to be reported from the aircraft down to air traffic control.

There are various ways in which information utilized in the classified system can be inadvertently transmitted to the ground in an unclassified manner. This can be from signals leaking from a classified local area network used in the aircraft to provide missile warning onto an unclassified local area network used with the plane's transponder to report missile threat detection to the ground.

Therefore, the problem is going from a classified system to be able to generate a report that is useful on the ground in which the reporting system operates on an unclassified network. As will be appreciated, there are very strict rules and regulations for communications between classified and unclassified networks. It is covered by the National Industrial Security Program Operating Manual, NSPOM, which is a government security document. This security document defines allowable connections between a classified local area network (LAN) and an unclassified local area network. The dilemma is that if one does not take precautions, then by simply connecting these two LANs together, one has brought the platform to the same level of security as the highly classified operational flight program for the aircraft.

Alert Reporting

By way of further background, the alerting system for ground personnel is to establish that a real missile has been encountered or that one has defeated the missile. This information is vitally important to the response that the ground station takes. Does air traffic control close all of the air corridors for the East Coast, for example? Do they mobilize the FBI or some other organization in order to go looking for some of the shooters? Thus, while what has transpired is important to be transmitted to the ground, care must be taken not to include highly classified information in this transmission.

Note a threat indicator can be a false alarm. However, the false alarm rate must be very, very low. It is also important to be able to tell ground personnel that the threat has been defeated, and if the threat was not defeated, then how much damage was done to the aircraft. Note that if the threat was defeated, it is quite possible that a live missile could hit the ground somewhere. Depending on where the aircraft is at the time, the ground impact might be a problem for a missile that was diverted off course due to the countermeasuring.

Moreover, even for very low probability of threats occurring, the air traffic control system or response agencies must take into account every time that a threat has been declared. If it turns out that there is a location somewhere on an aircraft that has false alarm indications, then ground personnel may want to seek out the cause of the disturbance and eliminate it.

Note also that it is important to be able to note the number of threats. The geo-location of the multiple threats could be indicated to the ground, as well as information as to whether or not any of the threats are coming from the same direction. This indicates to ground personnel that one has a hot spot, and ground personnel can potentially direct countermeasures to this hot spot. If the threats come from different directions, it is possible that one can infer something about the ground operations of the perpetrators of the threat.

SUMMARY OF THE INVENTION

In order to be able to communicate the existence of a target or threat utilizing a classified system, in the subject system one utilizes physical separation and either a filter that limits certain types of information that can go through from a classified LAN to an unclassified LAN; or that the classified LAN will never provide the classified information to the unclassified LAN.

In order to ensure security between local area networks, a physical separation between the two LANs is required, meaning that they cannot be electrically connected by wires. In the subject invention in order to provide the physical separation, the military missile warning system that employs a classified LAN does not use a general purpose bus, but rather only discrete signal lines. Moreover, each of these lines is isolated by opto-isolators on each line to provide a physical barrier between the electrical signaling associated with missile detection and the electrical signaling used in reporting a missile threat to the ground using an unclassified LAN. That way classified information used by the aircraft's missile warning system cannot inadvertently leak onto the unclassified LAN used to generate the emergency notification, EN.

Note that the opto-isolation technique provides a physical barrier by translating electrical signals on a discrete signal line that is a part of the classified LAN into photons that get emitted, reradiated, absorbed and converted into electrical signals at the other side of the opto-isolator. These converted signals are physically separated from the electrical signals that may contain classified information, which means there will be no inadvertent leakage to the unclassified LAN due to the physical separation.

Thus, the classified LAN used in the missile warning system and the unclassified LAN used for emergency notification reporting are fundamentally electrically isolated, having no physical connection between the LANs.

Secondly, in order to provide sufficient security between the classified LAN and the unclassified LAN, filtering is accomplished in two different ways. First, the bandwidth of the opto-isolators is limited so that the ability to inadvertently translate sidebands in an AM or FM signal across the divide between the LANs is diminished. This is because the response of the connection does not support high bandwidth FM/AM noise.

A second way to prevent classified data from being transmitted to the unclassified LAN is to prevent inadvertent data crossing the barrier using a predefined discrete interface. The interface strictly identifies what the states and modes are, and what are the proper responses that are acceptable coming across from the classified LAN to the unclassified LAN. In one embodiment the interface filtering function is set by the platform description interface layer.

Signaling for the interface is controlled by an interface control such that only particular states or combinations of signals are permitted to go across the interface. They are allowed to do so only because they have a predefined meaning. If the communication between the LANs does not fall within a predetermined truth table or stable table identified in the ICD, then it is not read, meaning it is not interpreted as having meaningful data.

Thus, in the subject invention there are three techniques to assure that classified data is not disseminated in an unclassified channel: (1) physical partitioning, (2) frequency response of the opto-isolators and (3) the utilization of a predefined interface which controls the format and the response constituting the handshake across the barrier between the LANs. If the system can be set up to only respond in predefined ways as described by the protocol that has been defined in the truth table or state table within the interface control document, then only that type of information is allowed to cross the barrier.

Since there is highly classified information in the missile warning system, it is a requirement not to inadvertently provide such information on an unclassified communications link, and most assuredly not to transmit the Operational Flight Program or jam codes. The task is to transmit only the conclusions that the missile warning system has arrived at, as opposed to how the missile warning system arrived at the conclusions.

The NSPOM is clear about not allowing one to connect to classified LANs when staying at an unclassified level, and the subject system is installed to make sure that there is no means, whether it be intentional or unintentional, to transmit the classified data to cross the barrier between the LANs.

Thus it is the purpose of the aircraft interface unit to isolate a classified LAN from the unclassified LAN in the aircraft, referred to as the standard ARINC 429 bus.

Note in one embodiment that the ARINC 429 communication bus is coupled to a transponder to provide unclassified information by modulating an RF transmitter that is part of the transponder control unit. Thus the information about the threat, its characteristics and the characteristics of the aircraft are transmitted to ground control through the transponder. As will be appreciated, it is the preformatted ARINC 429 information that is passed to the transponder.

Note also that all of the countermeasures, allocations, analyses, and evaluation of a countermeasure's effect is provided by a combination of the sensor subsystem and the Operational Flight Program running on the electronic control unit, ECU, embedded in the Operational Flight Program. The ECU is the electronic control unit that is part of the missile warning system.

As will be appreciated, what is transmitted to the ground is information about the threat, but not the highly classified information about how the information was derived. Note further that the subject system is a fully automated system, with the only pilot control being to either enable to disable the system.

In summary, an automatic system is provided for alerting ground personnel as to the existence of a threat to commercial aircraft in which the threat is determined by a classified system, but in which the local area network employed by the military missile warning is isolated from an unclassified local network coupled to the aircraft's transponder which transmits the threat existence and status to ground personnel. The barrier to transmitting classified information involves both filtering between the classified LAN and unclassified LAN, the use of only discrete signaling lines in the classified LAN isolated by opto-electronics to provide physical separation between the two local area networks, and communications formatting which precludes the transmission of classified information across the barrier between the classified local area network and the unclassified local area network.

BRIEF DESCRIPTION OF THE DRAWINGS

These and other features of the subject invention will be better understood in connection with a detailed description of which.

DETAILED DESCRIPTION

Figure 1:
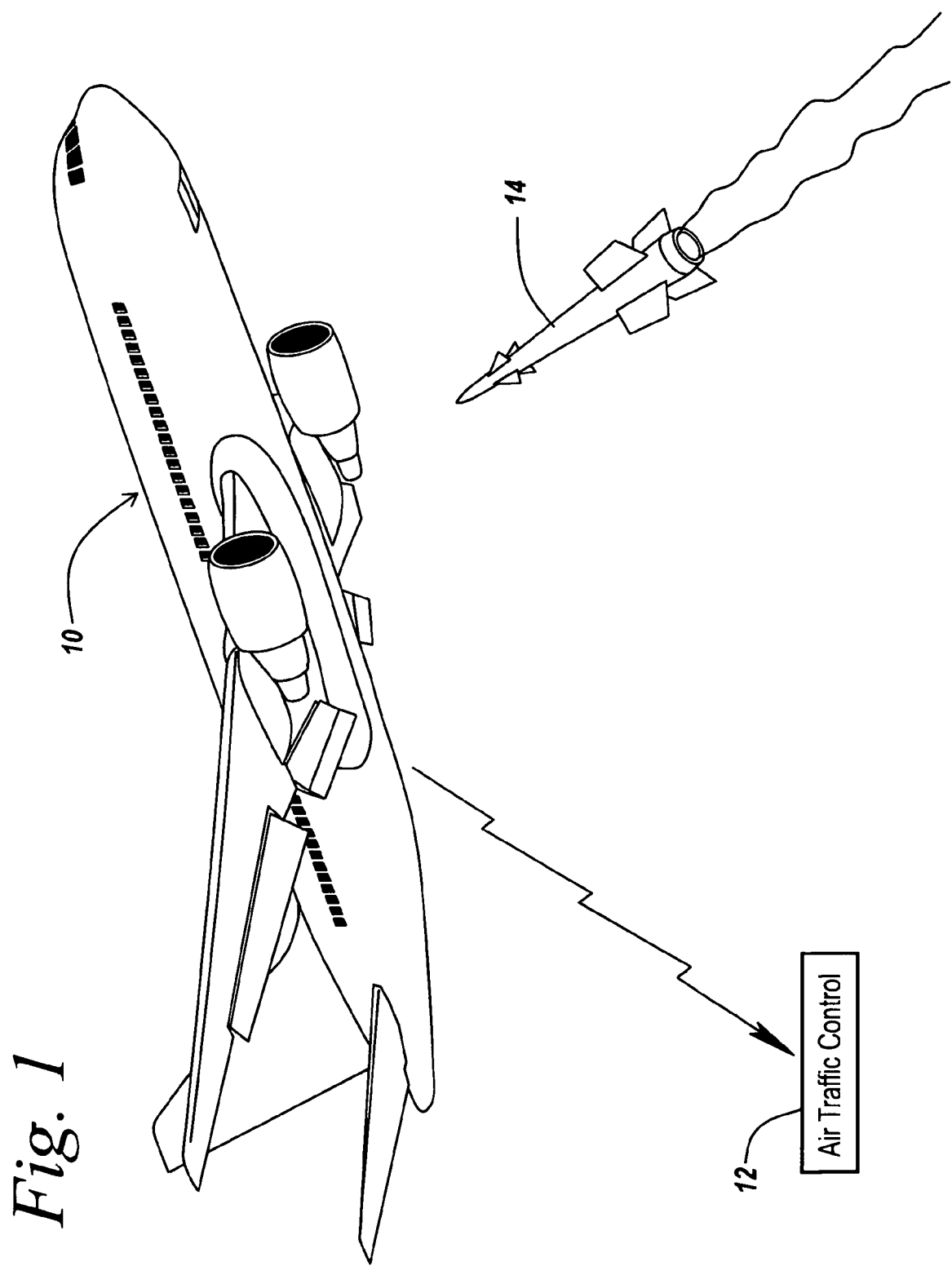
FIG. 1 is a diagrammatic illustration of a scenario in which a commercial airliner is attacked by a heat seeking missile and wishes to alert air traffic control with an emergency notification (EN) that provides an indication that an event has occurred with a declaration of a threat, the nature of the encounter, whether or not the threat has been defeated, and potentially damage assessment which may be verbal, with the message also potentially including angle of arrival data, position data and timing data.

Referring now to FIG. 1, it is a requirement that commercial airliners, here illustrated at 10, be able to report to the ground, namely to air traffic control 12, that a missile 14 has been launched towards the aircraft. It is the purpose of the subject invention to detect the presence of the incoming signal, provide information about the incoming missile, and report the fact of the detection of a missile threat to the ground.

This is done to be able to alert ground personnel as to the situation regarding a missile attack on an aircraft and also to permit ground personnel to be able to take whatever corrective action is appropriate given the information transmitted from the aircraft.

The aircraft transmits via its transponders the aircraft position information including position data or timing data and an indication in the form of an emergency notification (EN) that an event has occurred. The event's occurrence is in essence a declaration that a threat has been encountered, the nature of the encounter, whether or not the threat has been defeated and at least verbally a damage assessment if the threat has not been countered.

It is the purpose of the aircraft missile warning system to have an extremely low probability of false alarms, and this is supplied by a military grade missile warning system. In one embodiment, the Common Missile Warning System developed for the military is utilized to provide information that a threat has occurred.

As mentioned above, the problem with utilizing military grade threat detection and analysis is that it involves classified information, both as to the information loaded to enble the warning and also the transmission of data between various modules or units of the warning system. Typically, the warning system also includes a countermeasure or nullification system that in one embodiment involves a jammer that is programmed with a jam code to cause the missile to go off course and not impact the aircraft.

Figure 2:
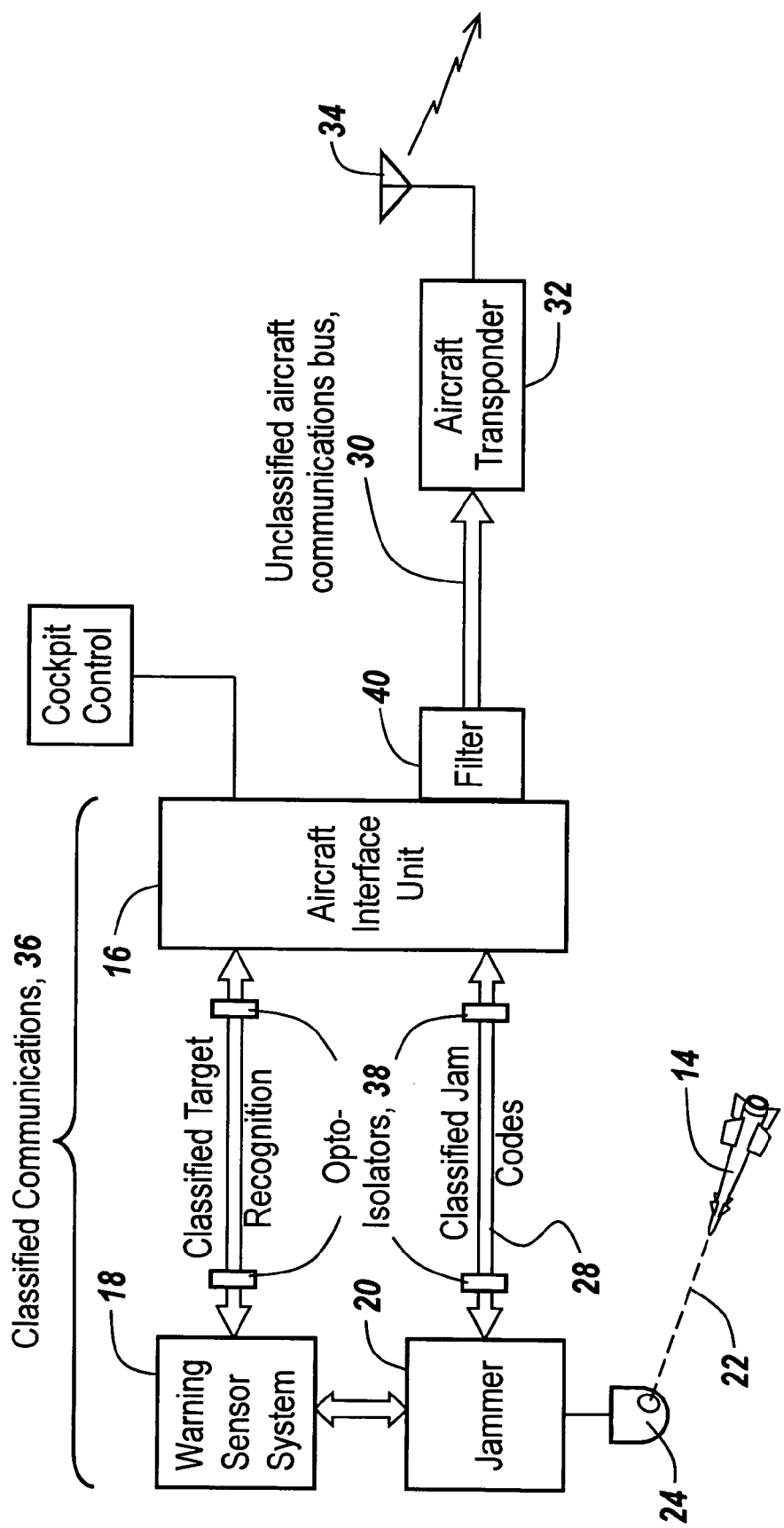
FIG. 2 is a diagrammatic illustration of the subject system illustrating that a portion of the system is on a classified bus and carries classified communications, whereas a second part of the system utilizes the commercial aircraft's unclassified communications bus to transmit the emergency notification message via the aircraft's transponder to aircraft traffic control, as illustrated in FIG. 1.

Referring to FIG. 2, in order for classified information to remain within the aircraft and not be transmitted to the ground, it will be seen that, from a conceptual point of view, the aircraft is provided with an aircraft interface unit 16 which is coupled to a warning sensor system 18, which is in turn coupled to a jammer 20 that produces a laser beam 22 from a turret 24 that is aimed towards the missile and is modulated with jam codes that cause the missile to go off course.

For the aircraft interface unit to work, there are buses between units 16, 18 and 20 which carry classified information. These buses are respectively labeled the classified target recognition bus 26 and the classified jam codes bus 28, which information is not ever to be placed on an unclassified bus.

The unclassified bus in this instance is an unclassified aircraft communications bus 30 which is coupled between the aircraft interface unit and the aircraft transponders 32 from which the emergency notification (EN) is transmitted via transponder antennas 34.

It is noted that classified communications occur as illustrated by bracket 36, whereas unclassified communications are those which are supposed to be outputted from the aircraft interface unit to the aircraft transponder, using an unclassified aircraft communications bus.

What is important in the subject invention is that there be isolation between the classified communications modules and the unclassified aircraft communications bus, which is one embodiment is an ARINC 429 standard bus.

From a conceptual point of view, the interface between the aircraft interface unit and the aircraft transponders is arranged such that no classified information can get across the barrier between the classified communications modules and the unclassified aircraft communications bus. Since both buses 24 and 26 contain only discrete signaling lines, opto couplers 38 at each end of a line provide the aforementioned physical isolation. Due to the physical isolation there is no through-the-air leakage of classified information to the unclassified LAN.

Moreover, in one embodiment and as shown at 40, the interface between the aircraft interface unit 16 and the unclassified aircraft communications bus 30 is a discrete interface used to eliminate contamination between the classified communications buses and the unclassified communications buses. The discrete interface is under control of the platform description layers which defines permissible transmissions. Interface 40 thus performs in filtering function to assure that no information which contains classified information crosses between the classified communications modules and the unclassified aircraft communications bus.

By virtue of these safeguards, all of the classified information contained in the aircraft interface unit, the warning sensor system and the jammer are prevented from crossing the barrier, leaving the emergency notification message devoid of classified information.

Figure 3A:
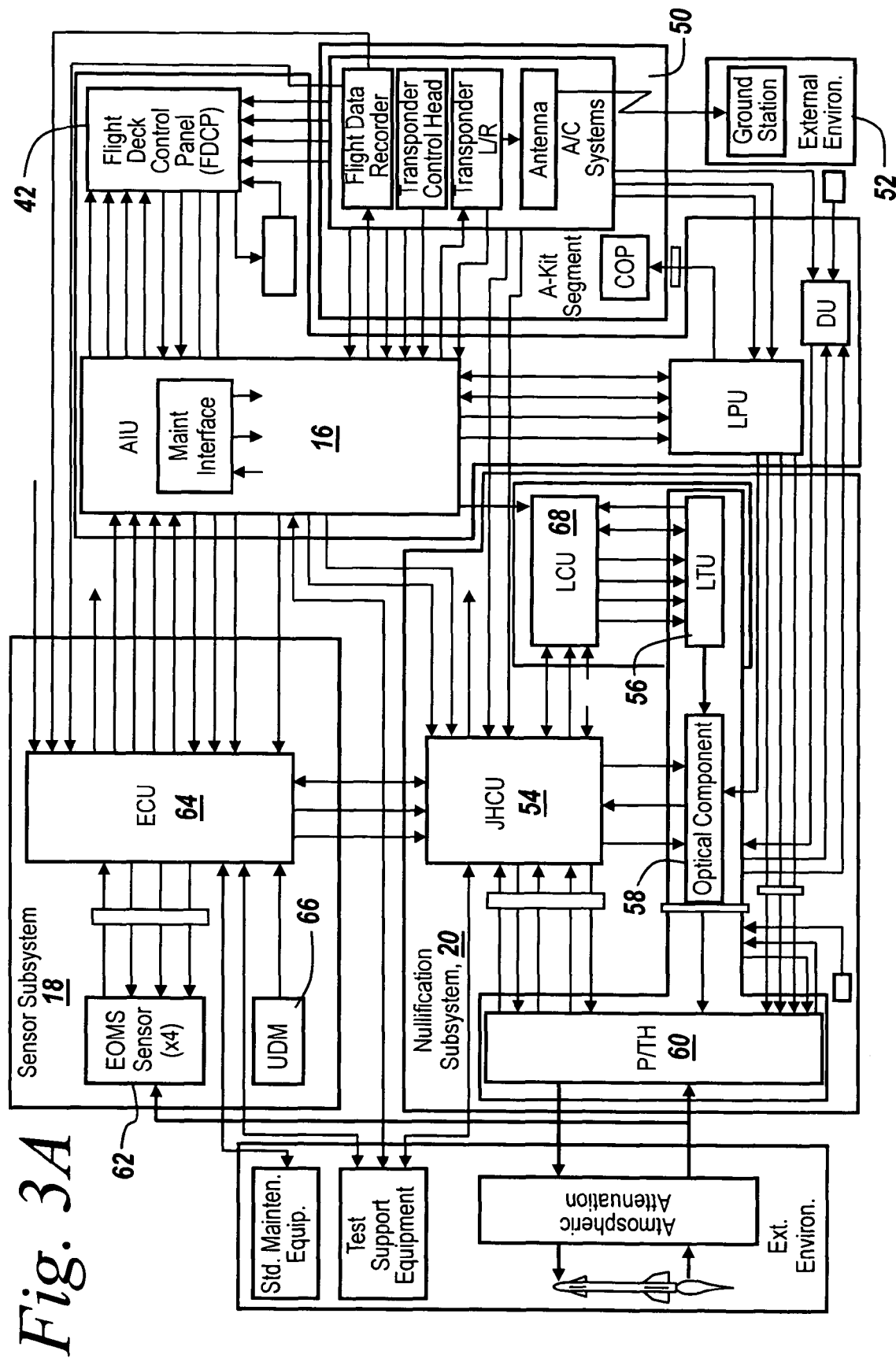
FIG. 3A is a diagrammatic executable view illustration of a system interface control diagram which has a sensor subsystem, a nullification subsystem, an aircraft interface unit and a so-called A-kit segment which includes the transponder used by the aircraft for communicating with the ground.

Referring now to FIG. 3A, what is seen is the executable view of the system interface control diagram which involves sensor subsystem 18, aircraft interface unit 16, and the jammer 20, constituting a nullification subsystem.

Note that the aircraft interface unit is coupled to a flight deck control panel 42 with interconnections between the flight deck control panel, the aircraft interface unit and a so-called A-kit segment 50 which constitutes the interface between the aircraft, its warning sensors and the transponder which connects to an antenna that couples the emergency notification to a ground station here shown at 52.

Note that the nullification subsystem includes a jam head control unit, JHCU, 54, a laser transmitter unit, LTU, 56, an optical bench assembly, OBA, 58 and a pointer tracker, P/Th, 60.

It is noted that in the sensor subsystem 18, there are a number of sensors 62, in one case four in number, which have their outputs coupled an electronic control unit, ECU, 64 in which the ECU holds all of the classified OFP parameters in a user data module, UDM, 66.

More particularly, with respect to the system of FIG. 3A and as an introduction, the Counter-MANPADS Advanced Threat Infrared Countermeasures/Common Missile Warning System (ATIRCM/CMWS) Countermeasures Set includes countermeasure functions for the Counter-MANPADS system that consists of two major subsystems; the sensor (CMWS) subsystem 18 and the nullification (ATIRCM) subsystem 20. The sensor subsystem includes Electronic Control Unit (ECU) 64 and four missile warning sensors. The nullification subsystem 20 includes Jam Head Control Unit (JHCU) 54, an Infrared Jam Head and a High Power Multi-Band Laser (HPMBL). In this configuration, the HPMBL consists of the Laser Control Unit (LCU) 68 and a Laser Transmitter Assembly. The Laser Transmitter Assembly itself is composed of a Laser Transmitter Unit (LTU) 56, and the Optical Bench Assembly (OBA) 58. The Optical Bench Assembly contains a Beam Steering Electronic Interface and Reference Laser. All of the above are Line Replaceable Units or LRUs.

For installation onto a commercial aircraft, two additional Line Replaceable Units, LRUs, are introduced that provide conditioned interfaces with the host aircraft. These LRUs are part of the installation's Infrastructure Segment and are designed to allow for the basic operation and maintenance of the Counter-MANPADS system. The infrastructure LRUs are the Flight Deck Control Panel 42 and the Aircraft Interface Unit (AIU) 16.

As to Counter-MANPADS Security, the standard Counter-MANPADS system contains three LRUs that have processors capable of processing data and algorithms. These are ECU 64, JHCU 54 and AIU 16. Two of the LRUs (the ECU and the JHCU) process data and algorithms up to the Secret level. The AIU does not contain or process any classified data or algorithms.

As to the Electronic Control Unit and Jam Head Control Unit Classified Processing, the majority of the memory for the ECU and the JHCU is volatile RAM. Classified information is loaded into volatile RAM only, at any time during processing. The processors also contain a small non-volatile flash memory that contains system boot-up routines capable of loading software from a classified removable flash hard drive called User Data Module (UDM) 66 into the processor volatile memory. The software is designed to ensure that only the unclassified boot-up routines are stored in non-volatile memory.

As to the Aircraft Interface Unit Unclassified Processing, the AIU is designed to provide the interfaces necessary for installation into commercial aircraft. The AIU design utilizes a Commercial Off The Shelf (COTS) computer processor that contains both volatile and non volatile memory. The interfaces with the Sensor and Nullification subsystems are specifically maintained as discrete signals incapable of intelligent communication to the classified Line Replaceable Units. The interfaces with the aircraft are composed of discrete signals and two ARINC 429 transponder communication channels. The software for the communication channels is designed to ensure that only one new AIU constructed message (Hijack Message) is transmitted along with other non-altered messages to the transponder when commanded via an ECU discrete signal.

Figure 3B:
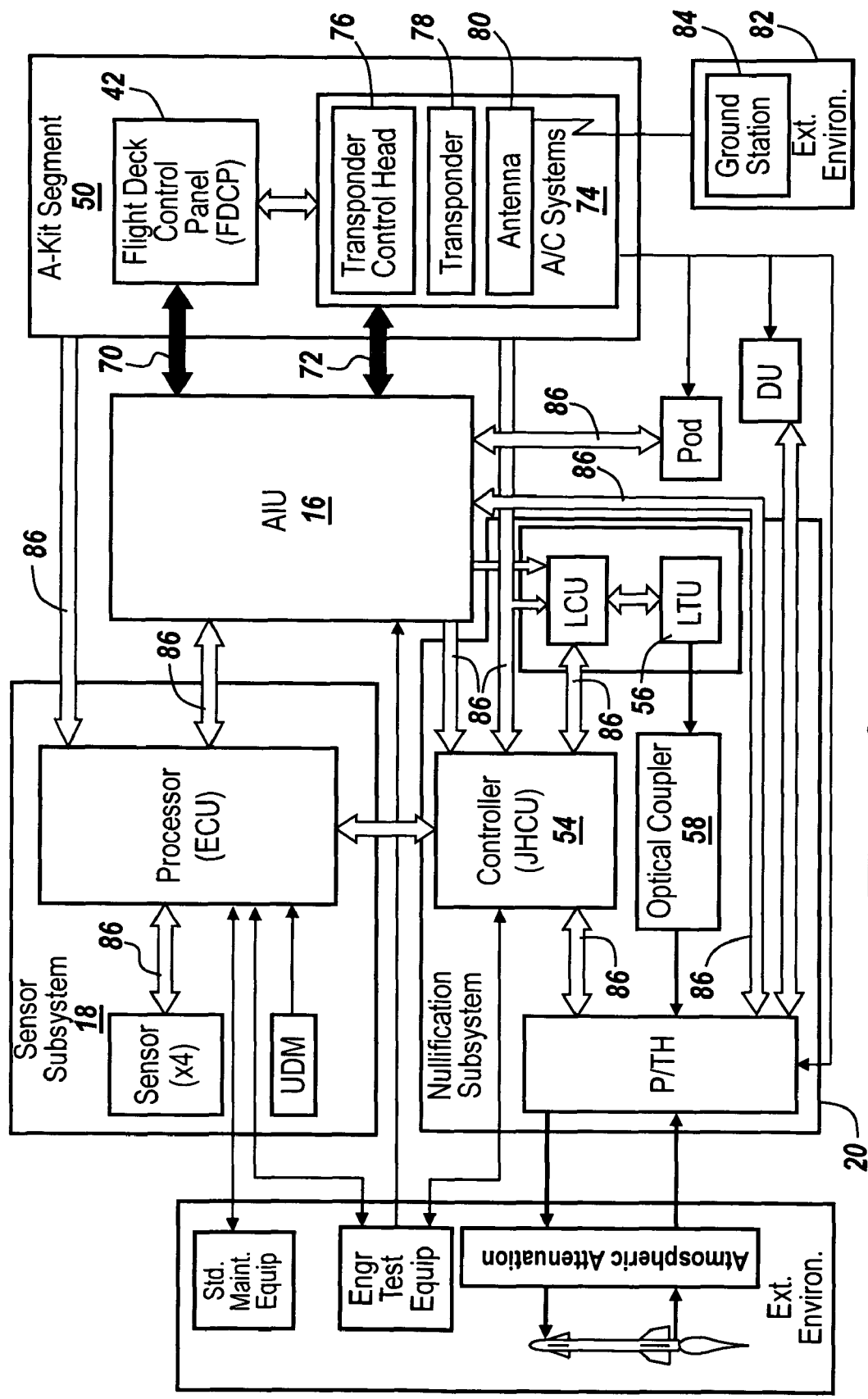
FIG. 3B is a diagrammatic illustration of the aircraft interface relations showing the potential for classified information to be generated across the classified buses as well as the unclassified buses.

An Aircraft Interface Unit Functional Overview is now provided. The AIU consists of elements that provide operational support functions, but not core countermeasure functions. These AIU functions include:
1. Power Control for System LRUs
2. Central BIT Initiation and Status reporting
3. Emergency Code Generation and Notification
4. Laser Safety Interlock Control
5. Sleep Mode Control
6. FDCP Interface
7. Maintenance Interface As to the AIU Characteristics, a high-level description of the AIU interfaces with LRUs internal and external to the Counter-MANPADS system is shown in FIG. 3B.

The AIU's main responsibility is to bridge between the commercial aircraft systems and the Sensor and Nullification Subsystems, originally designed for the military. The AIU allows for central control of the system power and built in test initiation and reporting. It also generates the Emergency Notification (EN) message, and interfaces to the aircraft transponder so the EN message can be sent to ground stations, notifying authorities that a threat has been engaged. Hardware logic in the AIU helps protect ground crews by determining when it is safe to allow the laser to fire. The AIU also helps extend the system's Mean Time Before Failure by enabling Sleep Mode. Lastly, the AIU enables the flight crew and maintainers to interface the system.

As to Message Traffic involved in the Sensor and Nullification Subsystem, the AIU does not contain any message based communication lines with either the ECU or the JHCU. The only Interfaces between the AIU and the Sensor Nullification subsystem are discrete signal lines. The following sections describe each discrete signal.

ECU to AIU Discrete Signals Messages

Table I lists the discrete signals from the ECU to the AIU. Overall behaviors and requirements are governed by the Counter MANPADS system specification. The list below provides a general description along with a System Specification traceability identifier column.

TABLE I

| AIU Pin | Signal Name | Description | SYS Spec ID | Category | True State | False State |
|---|---|---|---|---|---|---|
| P1A-10 | ECU_AIU_BIT_ECU | A true state Indicates that the ECU LRU is faulty. No data is available to indicate type or cause of fault. | 117178 | 28V Discrete Logic | 28V-RTN | Open/28V |
| P1A-11 | ECU_AIU_BIT_EOMS1 | A true state Indicates that the EOM # 1 LRU is faulty. No data is available to indicate type or cause of fault. | 117178 | 28V Discrete Logic | 28V-RTN | Open/28V |
| P1A-12 | ECU_AIU_BIT_EOMS2 | A true state Indicates that the EOM # 2 LRU is faulty. No data is available to indicate type or cause of fault. | 117178 | 28V Discrete Logic | 28V-RTN | Open/28V |
| P1A-13 | ECU_AIU_BIT_EOMS3 | A true state Indicates that the EOM # 3 LRU is faulty. No data is available to indicate type or cause of fault. | 117178 | 28V Discrete Logic | 28V-RTN | Open/28V |
| P1A-14 | ECU_AIU_BIT_EOMS4 | A true state Indicates that the EOM # 4 LRU is faulty. No data is available to indicate type or cause of fault. | 117178 | 28V Discrete Logic | 28V-RTN | Open/28V |
| P1A-15 | ECU_AIU_BIT_JHCU | A true state Indicates that the JHCU LRU is faulty. No data is available to indicate type or cause of fault. | 117178 | 28V Discrete Logic | 28V-RTN | Open/28V |
| P1A-16 | ECU_AIU_BIT_LTA | A true state Indicates that the LTA LRU is faulty. No data is available to indicate type or cause of fault. | 117178 | 28V Discrete Logic | 28V-RTN | Open/28V |
| P1A-17 | ECU_AIU_BIT_LCU | A true state Indicates that the LCU LRU is faulty. No data is available to indicate type or cause of fault. | 117178 | 28V Discrete Logic | 28V-RTN | Open/28V |
| P1A-18 | ECU_AIU_BIT_PTH | A true state Indicates that the P/TH LRU is faulty. No data is available to indicate type or cause of fault. | 117178 | 28V Discrete Logic | 28V-RTN | Open/28V |
| P1A-20 | ECU_DISCRETE_RTN_A | Electrical Ground | | 28V Discrete Return | 28V-RTN | Open/28V |
| P1A-21 | ECU_AIU_SNS_FAIL | A true state Indicates that the Sensor/Nullification subsystem is no longer functioning. No data is available to indicate type or cause of fault. | 118465 | 28V Discrete Logic | 28V | Open/Gnd |
| P1A-22 | ECU_AIU_EN_CUE | A true state Indicates that a missile engagement has been initiated. No data is available to indicate type or effectiveness of the engagement. This signal is used to activate indicators at the Flight Deck Control Panel (FDCP) notifying the flight crew of the engagement. This signal is also used to toggle a discrete line to the aircraft's flight recorder and send a message to the Air Traffic Control Transponder. | 117171 | 28V Discrete Logic | 28V | Open/Gnd |
| P1A-23 | ECU_AIU_WARM_UP | A true state indicates that the sensor Nullification subsystem has completed the warm-up requirements. This signal is used to activate indicators at the (FDCP) notifying the flight crew that the system is ready. | 118028 | 28V Discrete Logic | 28V | Open/Gnd |
| P1A-25 | ECU_DISCRETE_RTN_B | Electrical Ground | | 28V Discrete Return | 28V-RTN | Open/28V |

As to AIU to ECU Signals (Messages), Table II lists the discrete signals from the AIU to the ECU. Overall behaviors and requirements are governed by the Counter MANPADS system specification. The list below provides a general description along with a System Specification traceability identifier column.

For the security of the system to be maintained between a classified level and the unclassified level of buses 70 and 72, the AIU and attendant circuitry provides for the physical isolation throughout the opto-couplers and the filtering described above.

TABLE II

| AIU Pin | Signal Name | Description | SYS Spec ID | Category | True State | False State |
|---|---|---|---|---|---|---|
| P1A-29 | AIU_ECU_IBIT_CMD | A true state commands the ECU to perform Initiated Built In Test (IBIT) and report of faulty LRU status. No direct data or participation is available for the AIU | 117181 | 28V Discrete Logic | 28V-RTN | Open/28V |
| P1A-30 | AIU_ECU_SLEEP_ENABLE | A true state informs the ECU that the flight crew has selected sleep mode and the AIU will power down LRUs in accordance with the system requirements. | 117718 | 28V Discrete Logic | 28V-RTN | Open/28V |
| P1A-31 | AIU_ECU_LSI | A true state informs the ECU that the Laser Safety Interlock Circuit is active. The system laser safety is enabled. No data or interaction with the laser control is available at the AIU. | 118033 | 28V Discrete Logic | 28V-RTN | Open/28V |
| P1A-32 | AIU_ECU_DISCRETE_RTN | Electrical Ground | | 28V Discrete Return | 28V-RTN | Open/28V |
| P1A-33 | AIU_ECU_PWR_CTL | This signal activated an internal ECU power relay that connects the internal ECU power supply to the aircraft's 115VAC power. This signal is not connected to the ECU processor. | 118033 | 28V Discrete Relay Source | 28V | Open/Gnd |
| P1A-42 | AIU_ECU_PWR_CTL_COMMON | Electrical Ground | 118033 | 28V Relay Sink (POD) | 28V-RTN | Open/28V |

As to AIU to JHCU Signals (Messages), Table III lists the discrete signals from the AIU to the JHCU. Overall behaviors and requirements are governed by the Counter MANPADS system specification. The list below provides a general description along with a System Specification traceability identifier column.

Note that the main responsibility of the AIU is to bridge between the commercial aircraft systems and the sensor and nullification subsystems originally designed for the military. The AIU allows for central control of the system power and built in test initiation and reporting. It also generates the emergency notification message and interfaces to the aircraft

TABLE III

| AIU Pin | Signal Name | Description | SYS Spec ID | Category | True State | False State |
|---|---|---|---|---|---|---|
| P1A-51 | AIU_JHCU_LSI | A true state informs the JHCU that the Laser Safety Interlock Circuit can now be active. The system laser safety is enabled. No data or interaction with the laser control is available at the AIU. | 117177 | 28V Discrete Logic | 28V-RTN | Open/28V |
| P1A-52 | JHCU_DISCRETE_COMMON | Electrical Ground | | 28V Discrete Return | 28V-RTN | Open/28V |
| P1A-50 | AIU_JHCU_PWR_CTL | This signal activated an internal JHCU power relay that connects the internal JHCU power supply to the aircraft's 115VAC power. This signal is not connected to the JHCU processor. | 117144 | 28V Discrete Relay Source | 28V | Open/Gnd |
| P1A-41 | AIU_JHCU_PWR_CTL_COMMON | Electrical Ground | 117144 | 28V Relay Sink (POD) | 28V-RTN | Open/28V |

Referring now to FIG. 3B, the AIU interface relationships are now described.

As can be seen, the only bus between AIU 16 and A-Kit segment 50 are the buses 70 and 72, with bus 70 coupling the flight deck control panel 42 to the AIU and with bus 72 coupling an aircraft systems unit 74 to AIU 16.

As shown, the aircraft system 74 unit has a transponder control head 76 and a transponder 78 coupled to an antenna 80 which transmits signals from the aircraft to an external environment 82 including a ground station 84.

It is noted that those classified buses which could contain sensitive information are generally illustrated by 86, which by their coloration indicate that classified data may exist on these buses.

transponder so that the emergency notification message can be sent to ground stations, notifying authorities that a threat has been engaged. As an aside, hardware logic in the AIU helps to protect ground crews by determining when it is safe to allow the laser to fire.

Figure 4:
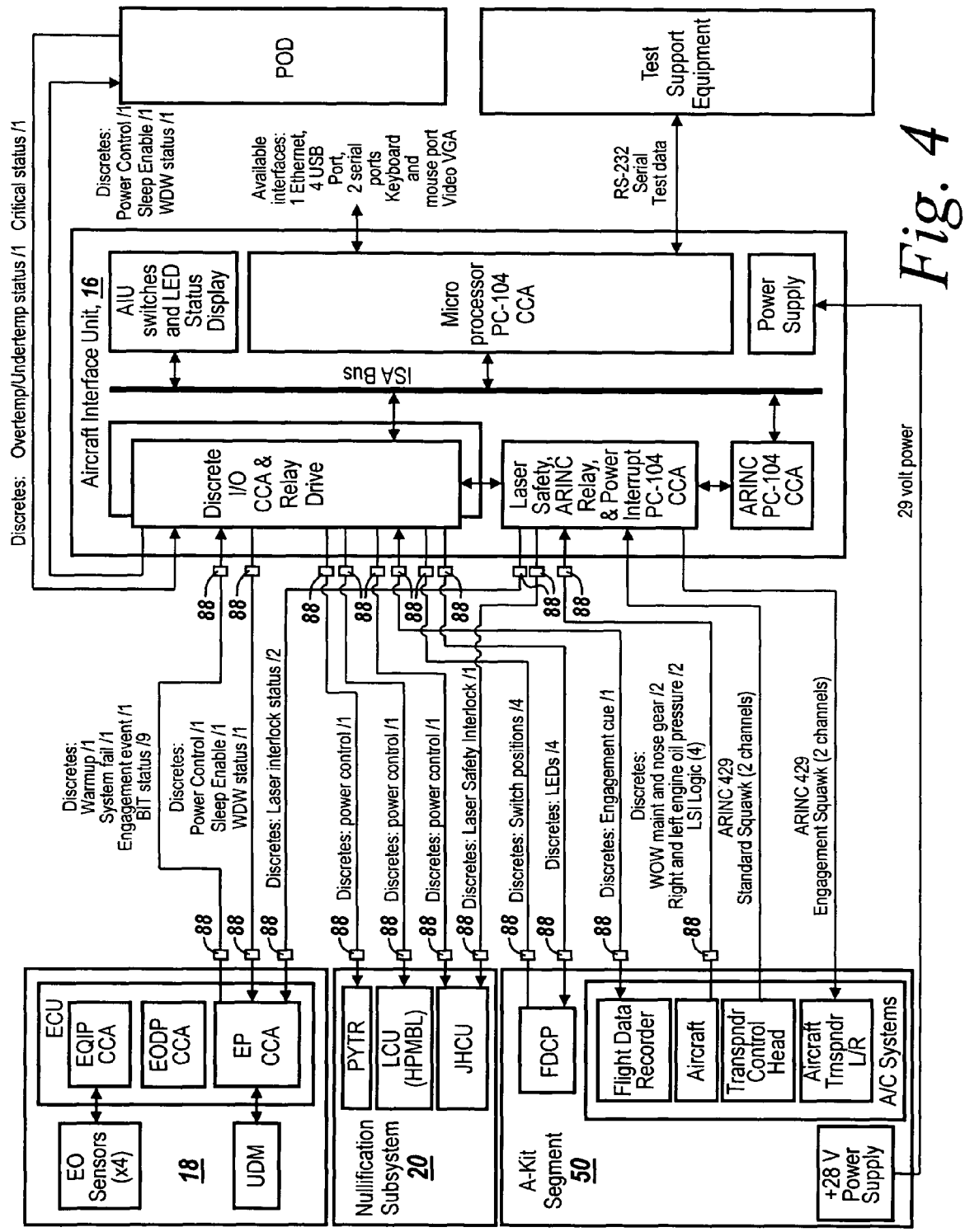
FIG. 4 is a diagrammatic illustration of the system to AIU interface, which constitutes a lock diagram illustrating the aircraft interface unit connected to the A-kit transponders over a standard unclassified communications channel, namely the ARINC 429 bus.

Referring now to FIG. 4, what is shown is a System to Aircraft Interface block diagram. Here, aircraft interface unit 16 is shown connected to the sensor subsystem 18, the nullification system 20, and the A-kit segment 50, with all of the interconnections being discrete lines and therefore constituting discrete buses as opposed to a generalized bus. Note each of the discrete lines has opto-couplers 88 at each end.

Because of the use of discrete buses it is possible to limit the information that goes from the aircraft interface unit 16 to the A-kit segment 50.

Of particular note are the standard ARINC 429 buses 90 and 92. Discrete switch positions on bus 94, LED activation on bus 96 engagement cues on bus 98, and aircraft parameters on bus 100 do not contain any classified information.

Figure 5:
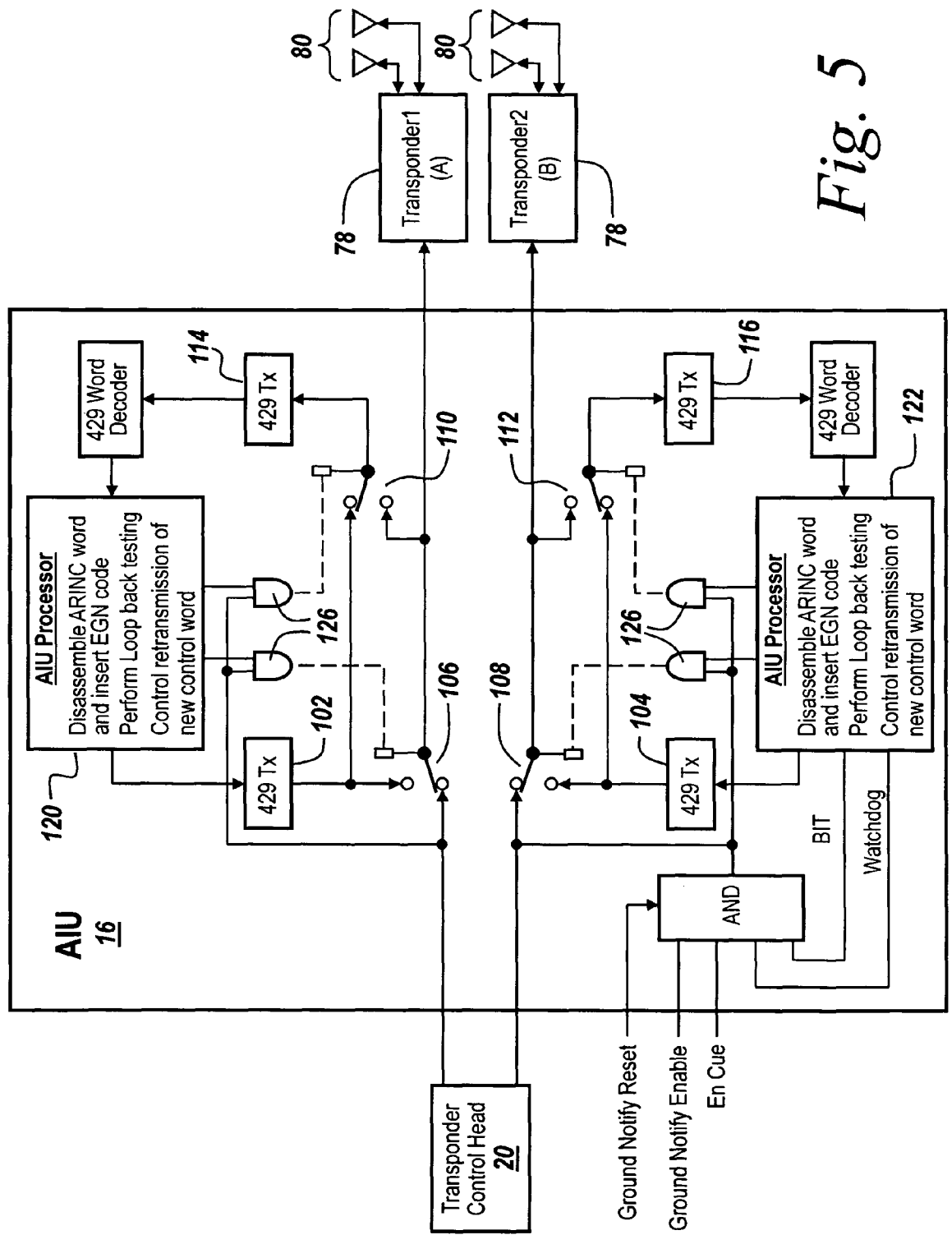
FIG. 5 is a functional block diagram illustrating the emergency ground notification architecture of the aircraft interface unit.

Referring now to FIG. 5, the emergency ground notification architecture is shown in a block diagram form in which AIU 16 is coupled to transponder control head 76, and thence to transponders 78 and antennas 80 to one of two transponder transmitters 102 and 104, which have their outputs respectively coupled by relays 106 and 108 to the indicated transponders. Relays 110 and 112 couple the outputs of the respective transponders to receivers 114 and 116, with the entire process for each of the two transmission links under the control of AIU processors 120 and 122 respectively through associated logic 124 and 126.

Figure 6:
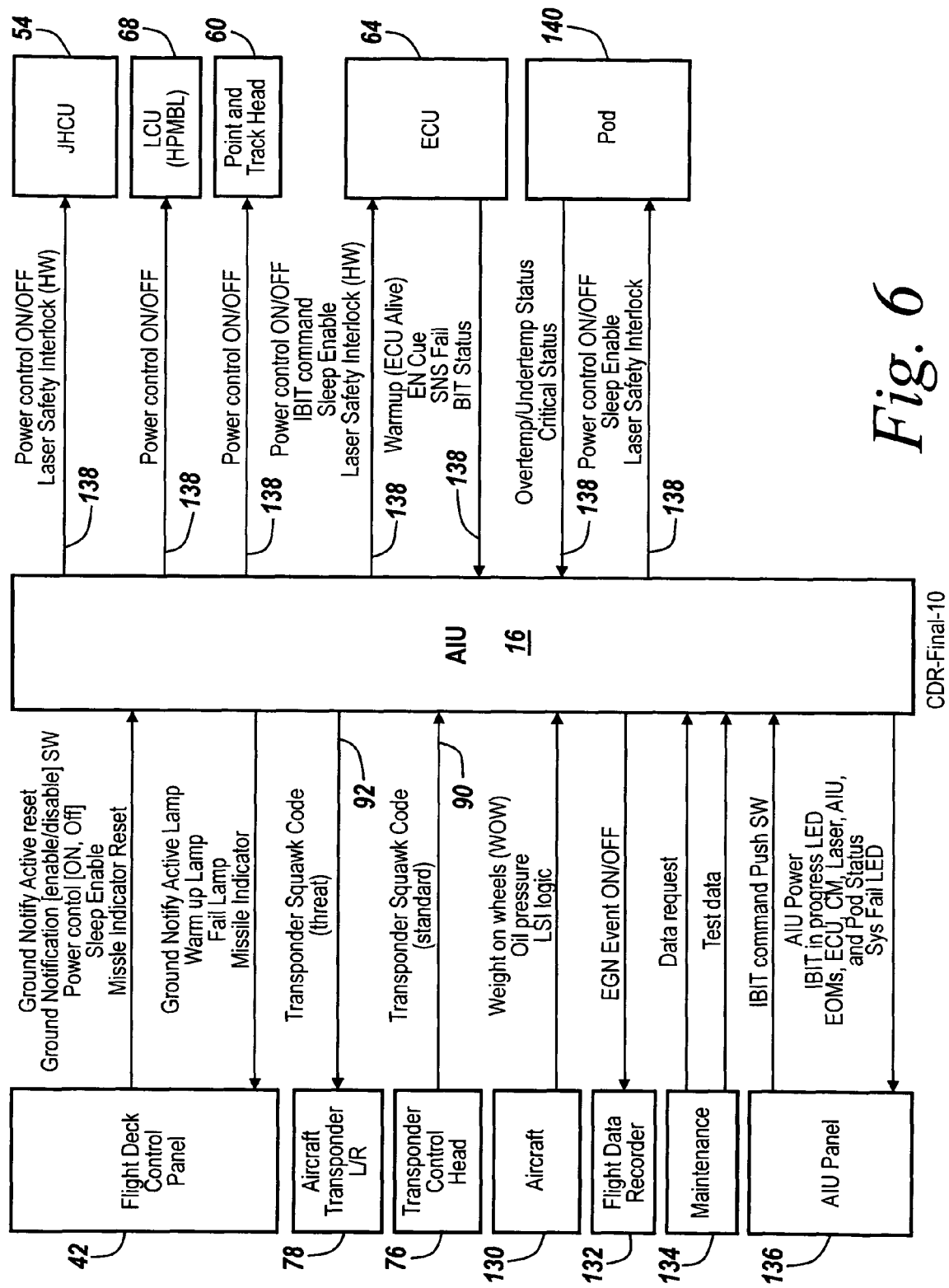
FIG. 6 is a data flow diagram of the aircraft interface unit illustrating the types of messages to and from the aircraft interface unit.

Referring now to FIG. 6, the AIU data flow is illustrated in which AIU 16 has handshake data coupled to flight deck control panel 42, aircraft transponder 78, transponder control head 76, aircraft weight on wheels, oil pressure and LSI logic 130, flight data recorder 132, maintenance module 134, and AIU panel 136. Power control on/off is provided over discrete buses 138 respectively to JHCU 54, LCU 68, a point and track head 60, ECU 64, and a pod 140 that has associated overtemp/undertemp critical status and power control on/off, sleep enable and laser safety interlock functions.

Here again it can be seen that the only interface between AIU and transponder control head 76 and transponders 78 are on buses 90 and 92, with the barrier between the AIU and these buses constituting the barrier between the classified information in the system and an unclassified portion of the system.

Figure 7:
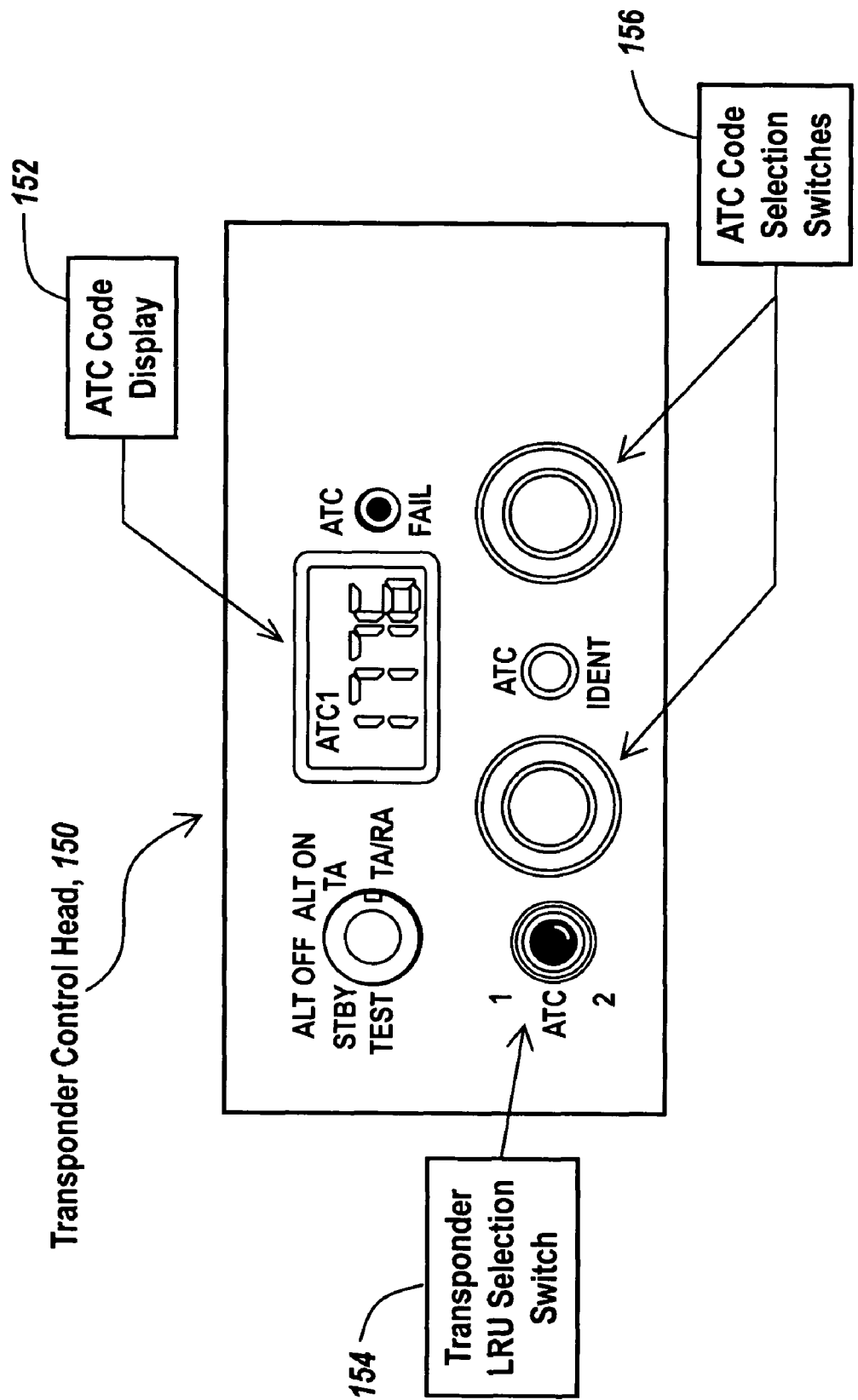
FIG. 7 is a diagrammatic illustration of the transponder control head available in the cockpit of the commercial aircraft of FIG. 1; and, FIG. 8 is a diagrammatic illustration of the management of the ARINC communications bus, indicating the emergency notification format as well as replacing the 4096 code with the emergency notification code.

Referring now to FIG. 7, it will be appreciated that the only portion of the warning system and the reporting system under the control of the pilot is the transponder control head 150, which includes an ATC code display 152, a transponder LRU selection 154, and ATC code selection switches 156. It is noted that through this control head the only element of the system that can be controlled is the enabling or disabling of the entire system. The pilot is not permitted control of this automatic system and therefore the safeguards associated with the military level apparatus cannot be altered by personnel aboard the aircraft other than to turn it on or turn if off.

Figure 8A:
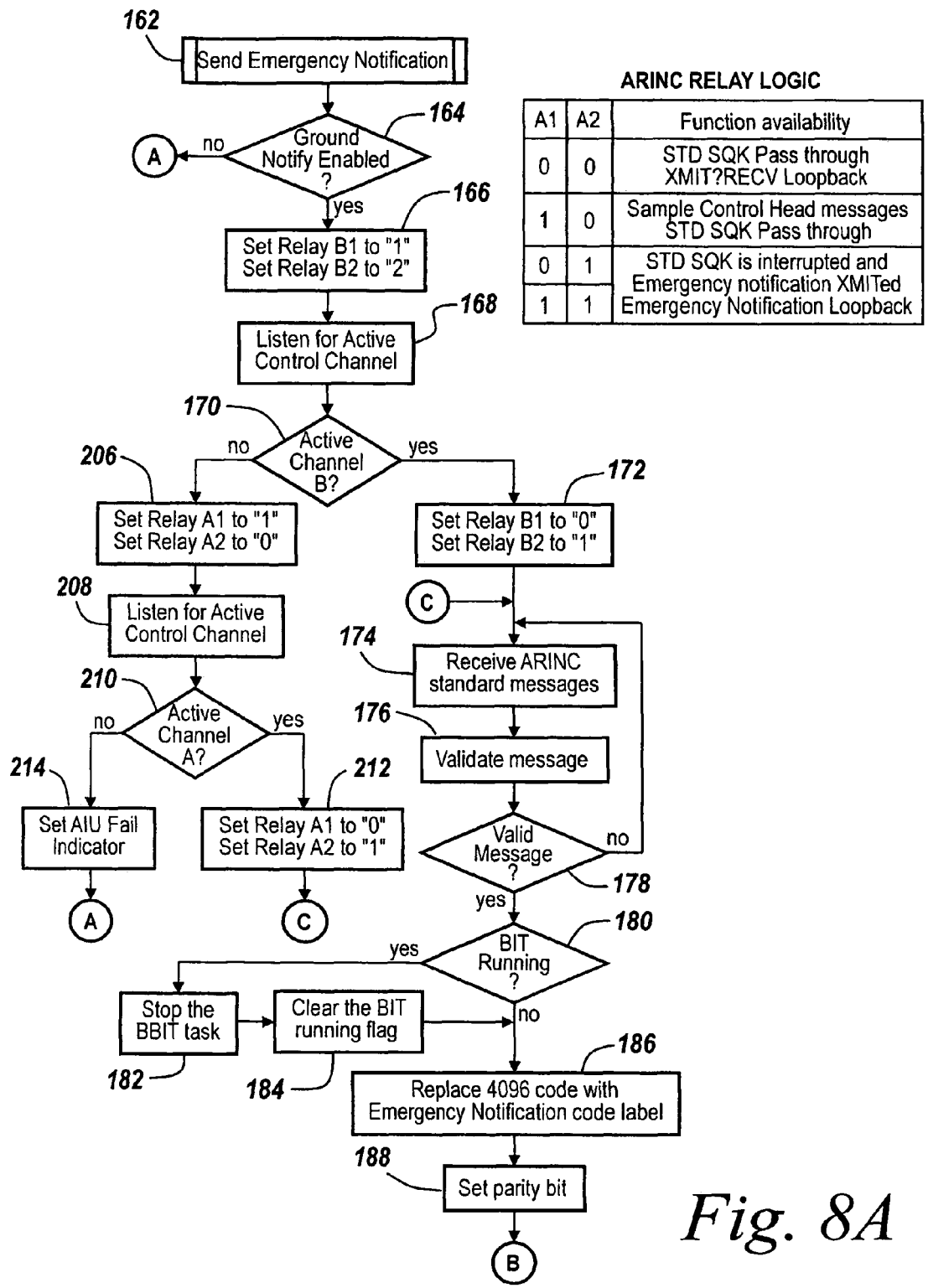
Figure 8B:
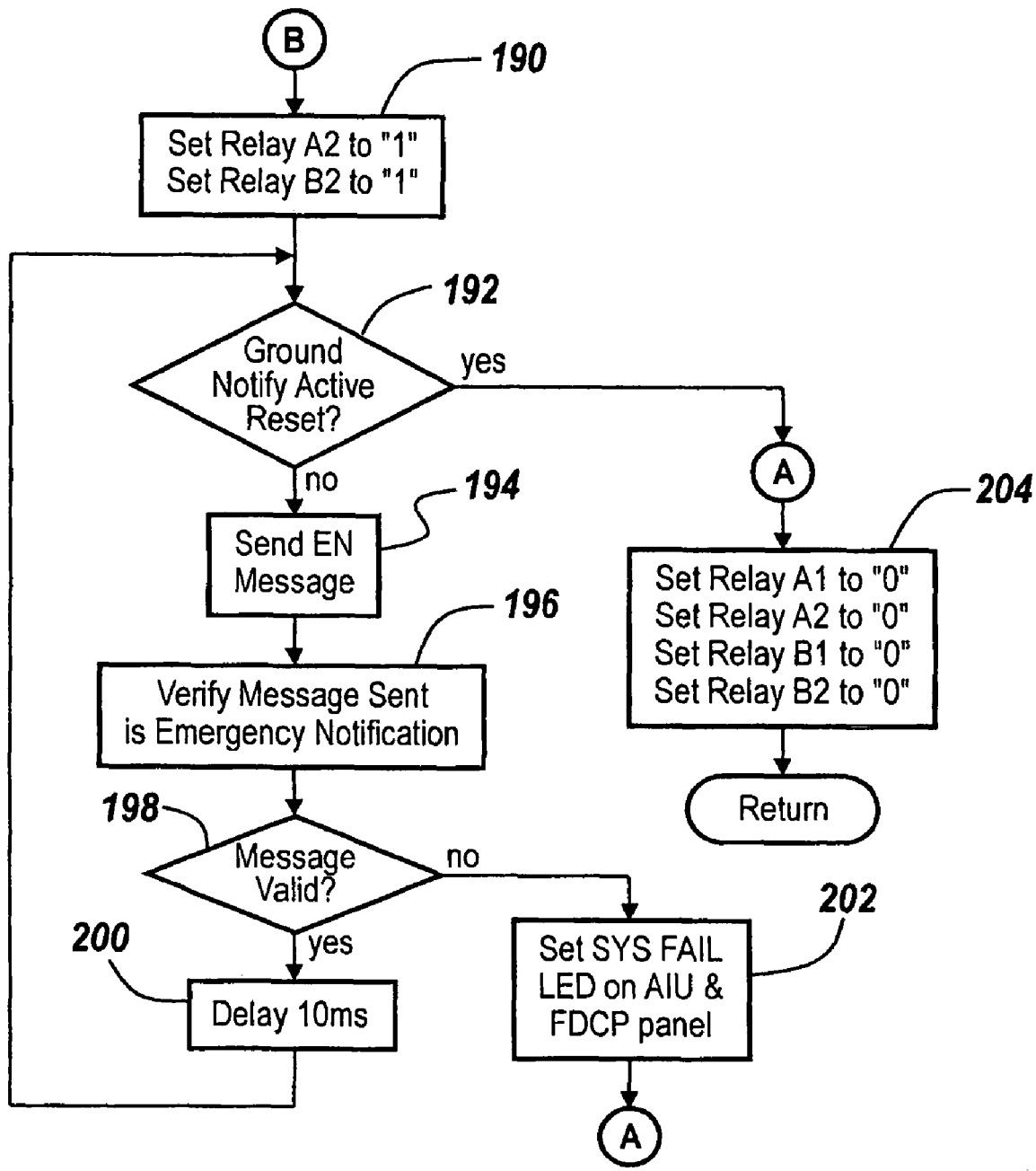

Referring now to FIG. 8, what is shown is a flow chart of the management of the emergency notification. Note that the emergency notification involves determination of an active control channel, listening for messages, validation of the messages, the provision of stop bit running if needed, the replacement of the 4096 code with the emergency notification code, the setting of a parity bit to odd or even, the bypass of both control channels, the sending of the emergency notification message along with any other messages and the sending of a validated message.

The message format is illustrated at 160, whereas the message notification protocol is indicated at box 162 by the initiation of the emergency notification, a decision box 164 which ascertains if the ground is to be notified. If the ground is to be notified, relays B1 and B2 are set respectively to one and zero as indicated at 166, and as illustrated at 168 the system listens for active control channels, and if there is an active control channel, as indicated by decision box 170, the relays are set B1 to zero and B2 to one as illustrated at 172, which results in the receipt of ARINC standard messages at 174 followed by a message validation at 176, a determination of a valid message at 178, and a determination of a bit running at 180, resulting in a stop bit task 182, the clearing of the bit running flag 184, and the replacement of code 4096 with the emergency notification code label at 186. If there is no bit running, then the system replaces the 4096 code with the emergency notification code label. Then, at 188 a parity bit is set.

When the parity bit is set, relay A2 is set to one and relay B2 is set to one, as illustrated at 190, followed by a decision block 192, which ascertains if the ground notification active reset has been reset. If not, then the emergency notification message at 194 is coupled to a box 196 which verifies that the message sent is the emergency notification. A decision is made at block 198 determining whether the message is valid and if yes, a delay of 10 milliseconds is imposed at 200. If not, a system fail LED is illustrated at 202.

On the other hand, if the ground notification activation has been reset, then relay A1 is set to zero, A2 is set to zero, B1 is set to zero, and B2 is set to zero, as illustrated at 204.

If the decision at decision block 170 indicates that active channel B is not available, then relay A1 is set to one and relay A2 is set to zero, as illustrated at 206. The system then listens for an active control panel, as illustrated at 208, and if there is an active control channel A available, as illustrated at decision block 210, relay A1 is set to zero and relay A2 is set to one, as illustrated at 212. If there is no active channel A, then the AIU fail indicator is set at 214.

What has been described is an emergency notification system which reports an incident through the transmission of unclassified data to the ground using the isolation techniques described above.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for reporting a missile threat to a commercial aircraft, comprising the steps of:

providing the commercial aircraft with a missile warning system in which the warning system operates at a classified level and has internal buses which in part carry classified information from one module to another within the missile warning system;

from the output of the missile warning system generating and transmitting an emergency notification signal to the ground reporting a missile threat; and, preventing the classified information contained within the missile warning system from appearing on the transmission of the emergency notification signal.

2. The method of claim 1, wherein either inadvertently or advertently coupling of classified information from the missile warning system to the transmitted emergency notification signal is prevented by filtering any signal transmitted from the missile warning system to the emergency notification signal transmission.

3. The method of claim 2, wherein the filtering step includes providing an interface between the missile warning system and the generated and transmitted emergency notification signal having a predefined format that permits only data having the format to be transmitted to ground.

4. The method of claim 1, wherein the classified information carried between the modules of the missile warning system is carried solely on discrete signaling lines between the modules, thereby avoiding the use of a general purpose bus.

5. The method of claim 4, wherein each of the discrete signaling lines is provided with opto-couplers to provide separation between a source of a signal on a discrete signaling line and the detector on the signaling line, thus to provide physical separation.

6. The method of claim 5, wherein the opto-couplers have a narrow bandwidth thus to suppress inadvertent broadband signals from passing along the discrete signaling lines.

7. The method of claim 4, wherein discrete signal lines within the modules of the missile warning system comprise a local area network carrying classified information, and wherein the transmission of the emergency notification signaling includes the utilization of an unclassified local area network.

8. The method of claim 7, and further including the step of filtering information from the classified local area network to the unclassified local area network to effectively form a barrier between the two networks incapable of passing classified information therebetween.

9. The method of claim 8, wherein the filtering step includes providing communication formatting of the information transmitted from the classified local area network to the unclassified local area network by an interface that precludes transmission of classified information from the classified to unclassified network across the interface.

10. The method of claim 9, wherein the formatting is in accordance with an interface control document that specifies the allowable data to be transferred through the interface.

11. The method of claim 10, wherein the interface control document includes a truth table.

12. The method of claim 10, wherein the interface control document includes a stable table.

13. The method of claim 1, wherein the missile warning system includes one of an operational flight program and jam codes utilized to modulate a laser for projecting a jamming transmission towards an incoming missile, the operational flight program and the jam codes incorporating classified information, and wherein the filtering step prevents operational flight program information and jam code information from being embedded in the transmission of the emergency notification signal.

14. Apparatus for reporting a missile threat to a commercial aircraft, comprising:
a missile warning system having modules interconnected with a classified local area network;
an emergency notification warning system utilizing the aircraft's transponder system for transmitting an emergency notification signal to the ground indicating the detection of an incoming missile as determined by said missile warning system;
an unclassified local area network connecting an output of said missile warning system to said unclassified local area network; and,
a filter system for preventing classified information from being transmitted from the missile warning system to said unclassified local area network.

15. The apparatus of claim 14, wherein said filter system includes an interface between said missile warning system and said unclassified local area network that prevents classified information from being transmitted thereacross.

16. The apparatus of claim 15, wherein said interface includes a predetermined format for the information to be transmitted thereacross, the format precluding transmission of data representing classified information across said interface.

17. The apparatus of claim 14, wherein said classified local area network includes only discrete signaling lines between the modules of said missile warning system, and further includes electro-optical isolators at either end of said discrete signaling lines, thus to provide physical isolation between a signal source on a discrete signaling line and a detector coupled to said signaling line.

18. The apparatus of claim 17, wherein said electro-optical isolators have a narrow bandwidth, thus to preclude broadband signals from transiting the associated discrete signal line.

19. The method for preventing classified data carried on a classified local area network from being disseminated to an unclassified local area network, comprising:
providing at least one of a physical partition between the classified local area network and the unclassified local area network only discrete signal lines for the management of the classified data, optical isolators at the ends of each line, the frequency response of the optical isolators being a narrow band frequency response, a predefined interface which controls the format of and response to the classified data, the predefined interface constituting a barrier between the classified data and data to be transmitted on the unclassified channel.

20. The method of claim 19, wherein the classified data is that associated with a missile warning system, and wherein data on the unclassified local area network is utilized to report the detection of an incoming missile toward an aircraft.

* * * * *